United States Patent [19]

Jinda et al.

[11] Patent Number: 4,805,296
[45] Date of Patent: Feb. 21, 1989

[54] METHOD OF MANUFACTURING PLATINUM RESISTANCE THERMOMETER

[75] Inventors: Akihito Jinda, Nara; Hisatoshi Furubayashi; Masaya Hijikigawa, both of Yamatokoriyama; Hiroki Tabuchi, Nara, all of Japan

[73] Assignee: Sharp Kabushiki Kaisha, Osaka, Japan

[21] Appl. No.: 905,392

[22] Filed: Sep. 10, 1986

[30] Foreign Application Priority Data

| Sep. 10, 1985 | [JP] | Japan | 60-201155 |
| Oct. 31, 1985 | [JP] | Japan | 60-246505 |
| Nov. 27, 1985 | [JP] | Japan | 60-182779[U] |
| Dec. 19, 1985 | [JP] | Japan | 60-287113 |
| Jan. 7, 1986 | [JP] | Japan | 61-1587 |

[51] Int. Cl.$^4$ ............................................. H01C 17/06
[52] U.S. Cl. ............................................. 29/620; 338/25; 338/292; 338/308; 427/102; 427/103
[58] Field of Search .................. 29/620; 427/102, 103; 338/25, 292, 308, 314

[56] References Cited

U.S. PATENT DOCUMENTS 4,129,848 12/1978 Frank et al. ............................. 338/25
4,649,365 3/1987 Furubayashi et al. ................. 338/25

FOREIGN PATENT DOCUMENTS 1522221 8/1978 United Kingdom.
1538948 1/1979 United Kingdom.

Primary Examiner—P. W. Echols
Attorney, Agent, or Firm—Birch, Stewart, Kolasch & Birch

[57] ABSTRACT

A method of manufacturing a resistance thermometer which includes the steps of preparing a support substrate and forming a platinum film, which serves as a temperature measuring element, on the support substrate by a sputtering process employing a sputtering gas which contains a predetermined amount of oxygen gas, and a resistance thermometer produced by the method. The method which optionally includes forming an aluminum oxide film, the substrate and the platinum film.

3 Claims, 3 Drawing Sheets

→ TIME

METHOD OF MANUFACTURING PLATINUM RESISTANCE THERMOMETER

BACKGROUND OF THE INVENTION

The present invention relates to a temperature sensing device and more particularly, to a method of manufacturing a resistance thermometer mainly composed of platinum and the resistance thermometer produced by said method.

Heretofore, platinum has been widely employed as a material for temperature sensors because, due to its favorable chemical stability, platinum with a high purity may be readily obtained, together with platinum having a large temperature dependency in its electrical resistance. In connection with the above, a temperature sensor in which a very fine platinum wire which is spirally wound around an insulator, such as mica or the like, is inserted in a protective tube, has been widely applied to actual resistance thermometers, and standards for these are specifically set forth in JIS (Japanese Industrial Standards) C-1604, DIN 43760 and IEC Pub. 751.

However, the known platinum resistance thermometer although these thermometers do provide a high degree of accuracy, do have the following various disadvantages:

(i) Low mechanical strength
(ii) Troublesome procedures for manufacture
(iii) Large size
(iv) High cost In order to overcome the disadvantages as described above, resistance thermometers employing thick films or thin films of platinum have recently been developed, some of which are commercially available. However, since thick film platinum resistance thermometers are based on the screen printing technique, it is difficult in the manufacture of these thermometers to obtain a very fine pattern at a size smaller than 100 $\mu$m, with a large scattering. Meanwhile, the thin film platinum resistance thermometer generally has the following advantages:

(i) Since a very fine pattern is readily formed, the thin film resistance thermometer can be made compact in size, while a high sensitivity thereof may be achieved through high resistance.
(ii) High mechanical strength.
(iii) Scattering in characteristics can be reduced through a wafer treatment, and thus, the thermometer is suitable for mass production, with a consequent reduction in cost.

Commonly, as a method of manufacturing a resistance thermometer with the use of the aforementioned thin film platinum, there have been adopted the steps of causing a thin film platinum with film thicknesses in the order of several thousands angstroms, to adhere on an insulative substrate through the employment of a vacuum deposition process, a sputtering process, etc., forming the platinum thin film into a fine pattern by a wet etching process, sputter etching process or the like, and heat-treating the platinum thin film thus processed in an atmosphere at high temperatures of 800° to 1,400° C., with subsequent resistance adjustments by trimming, formation into a chip, and leading out lead wires, etc., to obtain the resultant resistance thermometer.

Of the various methods for forming the platinum thin film, in the case in which the sputtering process is adopted, it is common practice to employ an inert gas, such as argon or the like, as the sputtering gas. However, the temperature coefficient of resistance (referred to as TCR hereinafter) of the platinum thin film produced in the above method is considerably smaller when compared with the TCR of the bulk material, and for the above reasons, there may be considered the following factors. For example, in connection with the characteristics of the material for the thin film as referred to above, size effects and structural defects are characteristics which affect the physical properties to a large extent. The size effects mean influences which take place in all transport phenomenon of electrons resulting from reduction in the mean free path of electrons in terms of effectiveness due to nonelastic struggling or dispersion of the electrons within the thin film, and such influences become conspicuous particularly when the film thickness is generally of the same degree or less than the mean free path of the electrons. Meanwhile, since the process of forming the thin film involves a rapid cohesion from gaseous phase to solid phase in a space where gas molecules or ions, which are unrelated to the thin film substance are present, all structural defects which are inherent in crystals such as holes, interstitial atoms, various dislocations, stacking fault, grain boundary, etc., are introduced into the thin film, while different types of atoms and molecules are mixed as impurities, resulting in a scattering of the electrons.

Due to the influences by the above phenomenon, a characteristic in which the specific resistivity of the thin film becomes large as compared with the bulk platinum material results, and accordingly, the TCR of the platinum thin film becomes lower than the TCR of the bulk platinum material, with a consequent lowering of the sensitivity of the platinum thin film as a resistance thermometer. Therefore, it has been conventionally required to develop a manufacturing method capable of obtaining a platinum thin film having a large TCR, without any defects as described above.

Meanwhile, alumina, sapphire, silicone, glass, etc., are employed as the substrate of the platinum thin film, and respectively, have merits and demerits as described below.

Namely, the alumina substrate is inexpensive and heat-resistant, with superior adhesion to platinum, but its rough surface presents a problem in the formation of a very fine pattern. Although the surface may be smoothed, if a surface polishing is applied, the polishing of the alumina substrate with a large hardness, results in an extreme cost increase in the substrate material. The sapphire substrate is superior in heat-resistance, adhesion with respect to platinum and smoothness on the surface, but has such disadvantages in that it is very expensive, and moreover, it is difficult to cut into very small chips, etc. Although silicone substrate is advantageous in that it is comparatively cheap, with a good smoothness, and can be easily processed, there is the drawback in that an alloy is formed with respect to the platinum thin film when a heat-treatment is effected at high temperatures, thus also resulting in a problem related to sensor characteristics. The glass substrate is inexpensive, but has the problems in that it is not provided with a sufficient adhesion with respect to the platinum, and that it is inferior in the heat-resistance.

As described earlier, in the method of manufacturing a resistance thermometer with the use of a thin film platinum, it is common practice to adopt the steps of causing the thin film platinum having film thicknesses, in the order of several thousand angstroms, to adhere onto the insulative substrate through the employment of the vacuum deposition process, sputtering process, etc., forming the platinum thin film into a fine pattern by the wet etching process, sputter etching process or the like, and heat-treating the platinum thin film thus processed in an atmosphere at high temperatures of 800° to 1,400° C., with subsequent resistance adjustments by trimming, leading out lead wires and formation of a protective coating, etc.

For the resistance adjustments as described above, in many cases, there has recently been employed a method in which part of the resistance adjusting pattern of the resistance film is cut off by a laser beam, and in this cut-off processing, the resistance adjusting pattern is cut off in several stages for adjustments through the addition of respectively different resistance values so as to finally obtain the necessary resistance value. For example, the adjustment is effected in such an order that it is made at 5% in the first stage, 1% in the second stage, and 0.2% in the third stage with respect to the total resistance value of the resistance film. Since very complicated adjustments of the resistance value are required as described above, there are involved such problems, such as the yield in production is lowered due to mistakes with respect to the adjusting values by workers or many working hours are required for the complicated work.

Moreover, with respect to a flow rate or flow velocity measuring method capable of measuring the temperature and flow velocity of a liquid through utilization of the resistance thermometer as in the present invention, there have been various conventionally known modes, and in the case where measurements are taken the through utilization of a variation in the amount of heat to be transmitted from a heat generating resistor to a fluid, such amount of heat conducted to the fluid also varies with respect to the temperature variation of the fluid. In the conventional measuring method, to compensate for such an inconvenience, there is provided a resistance thermometer for measuring the fluid temperature, and the resistance thermometer and heat generating resistor are connected in a bridge circuit so that a temperature difference therebetween is held constant, while the output from the bridge circuit to be fed back is amplified for the compensation of the influence by the fluid temperature. However, in the above known practice, for the resistance thermometer to be able to accurately measure the temperature of the fluid, it is necessary to space the resistance thermometer and the heat generating resistor to avoid the influence of the heat by the heat generating resistor, thus introducing drawbacks, which would result in the size of the measuring unit to become large, with a reduction in mass-productivity. Meanwhile, it is required to render the temperature coefficient of the resistance thermometer to coincide with that of the heat generating resistor, but the perfect coincidence therebetween is extremely difficult, thus resulting in the cause of measuring errors.

SUMMARY OF THE INVENTION

Accordingly, a primary object of the present invention is to provide a method of manufacturing an improved platinum resistance thermometer which is capable of eliminating the disadvantages which are inherent in the conventional methods of this type.

In accomplishing this object, according to one preferred embodiment of the present invention, there is provided a method of manufacturing a resistance thermometer which includes the steps of applying an aluminum oxide film onto a silicone substrate, once subjecting the aluminum oxide film to a heat-treatment, subsequently forming a platinum film on the surface of said aluminum oxide film, and subjecting said platinum film to a stabilizing heat-treatment to form a resistance thermometer film.

According to the manufacturing method of the present invention, since the stabilization of the aluminum oxide film is achieved by effecting the heat-treatment at high temperatures in the stage where the aluminum oxide film has been formed on the silicone substrate, the scattering in the resistance temperature characteristics of the platinum film accumulated on the surface of the aluminum oxide film, which arises from the heat-treatment, can be reduced, thereby improving the stability and reproducibility of the sensor characteristics. The heat-treating temperature of the aluminum oxide film should preferably be equal to or be higher than the heat-treating temperature of the platinum film to be effected later. Normally, the heat-treating temperatures of the platinum film are in the range of 500° to 1,500° C., and therefore, the heat-treating temperatures of the aluminum oxide film are properly selected in the range from 500° C. to 1,700° C.

It is to be noted herein that the platinum resistance thermometer to be obtained by the present invention is not limited to thermometers which employ platinum in a thin film, but that a platinum resistance thermometer that employs platinum in a thick film can also be produced.

It is also to be noted that, to form the aluminum oxide film on the silicone substrate, any of the vacuum vapor deposition processes, such as, sputtering process, ion plating process, chemical vapor-deposition process, and anodizing process, etc., may also be applied, with the vacuum deposition process, sputtering process or ion plating process with less mixing of impurities being preferable for this purpose.

Another object of the present invention is to provide a method of manufacturing a platinum resistance thermometer as described above, which is capable of obtaining a thin film platinum resistance thermometer having a higher TCR without impairing advantages, such as the resistance thermometer.

To accomplish the above object, according to another aspect of the present invention, the manufacturing method fundamentally includes the step of forming a platinum film by the sputtering process on an insulative substrate or on a support substrate composed of a conductor or a semiconductor, coated by an insulating material, and is characterized in that a sputtering gas in the sputtering process contains oxygen. By employing such a sputtering gas, oxygen is to be mixed within the platinum thin film during the sputtering process, and the accumulated platinum thin film show a crystallinity which is different from that in the case of the inert gas such as argon alone, and consequently, the TCR becomes one which is suitable for the resistance thermometer.

A further object of the present invention is to provide a thin film platinum resistance thermometer which is provided with a higher TCR without losing the advantages as a resistor even when heat-treated at low temperatures.

For accomplishing the above object, according to a further aspect of the present invention, the manufacturing method fundamentally includes the step of forming a platinum film by the sputtering process in which the sputtering gas contains oxygen, on an insulative substrate or on a support substrate composed of a conductor or a semi-conductor and coated with an insulating material, and is characterized in that the temperatures for the heat-treatment are in the range of from 400° to 800° C. When the sputtering gas containing oxygen is employed, the oxygen is to be mixed within the platinum thin film during the sputtering process, and the accumulated platinum thin film shows a crystallinity which is different from that in the case of the inert gas such as argon alone, and consequently, the TCR becomes one which is suitable for the resistance thermometer.

In a still further aspect of the present invention, in the resistance thermometer in which a resistant film made of a thin film or thick film in a pattern is formed on the insulative substrate, corresponding adjusting values are displayed in positions in the vicinity of the respective adjusting portions of a resistance value adjusting pattern.

From the above arrangement of the present invention, since the adjusting values for the respective adjusting portions in the resistant value adjusting pattern are clearly understood at a glance, there is almost no possibility for mis-adjustment and thus, the adjusting work may be effected extremely quickly.

In still another aspect of the present invention, the flow rate or flow velocity measuring method is fundamentally based on the practice in which the measurement is taken through the utilization of variation in the amount of heat transmitted from the resistance thermometer to a fluid as referred to earlier, and is arranged to use one element commonly for the resistance thermometer and heat generating resistor by adopting a technical means for the driving method. More specifically, the above arrangement of the present invention is characterized in that large and small signals are alternately applied to the resistance thermometer, so that at the small signal, the fluid temperature is measured by the resistance value by setting the temperature of the resistance thermometer to be equal to that of the fluid, while at the large signal, heat is generated by the resistance thermometer to measure the heat generating temperature by the resistance value, whereby the flow velocity is obtained through the utilization of a variation of the heat generating temperature by the flow velocity. From the above arrangement, there is an advantage in that the flow velocity can be measured through a simple circuit construction without being affected by the temperature of the fluid.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
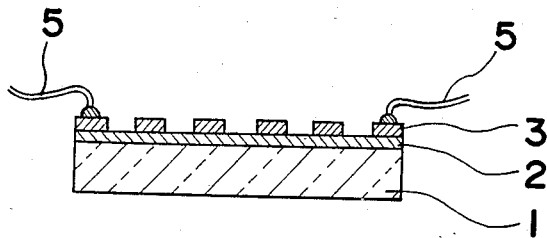
FIG. 1 is a side sectional view showing construction of a platinum resistance thermometer according to one preferred embodiment of the present invention.

Before the description of the present invention proceeds, it is to be noted that like parts are designated by like reference numerals throughout the accompanying drawings.

Referring now to the drawings, there is shown in FIG. 1, a platinum resistance thermometer according to one preferred embodiment of the present invention, which basically includes silicone substrate 1, aluminum oxide film 2 applied over silicone substrate 1, and platinum film 3 further formed in a pattern, over aluminum oxide film 2. Platinum film 3 is formed into a pattern, for example, in a meandering shape, and has lead wires 5 bonded to the opposite ends of said platinum film 3.

Figure 2:
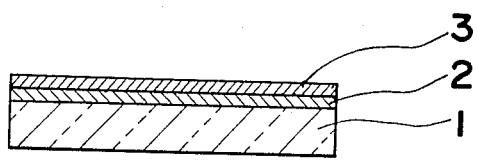
FIGS. 2 through 4 are side sectional views for explaining steps of manufacturing the resistance thermometer of FIG. 1.
Figure 3:
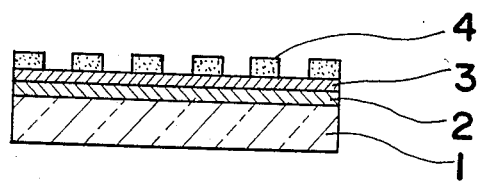
Figure 4:
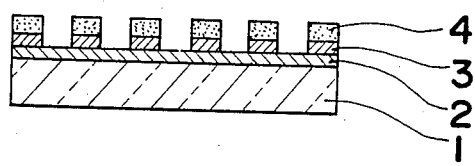

With particular reference to FIGS. 2 through 4, steps for manufacturing the platinum resistance thermometer of FIG. 1 will be explained hereinbelow.

In the first place, the aluminum oxide film 2 is caused to adhere onto the surface of silicone substrate 1 to the thickness in range of several thousand angstroms to several microns by the sputtering process or ion-plating process, and by effecting heat-treatment in atmosphere for 1 to 3 hours at a high temperature in the vicinity of 1,000° C., aluminum oxide film 2 is stabilized. Onto aluminum oxide film 2 thus treated, platinum film 3 is applied in the thickness of several thousand angstroms to several microns by the sputtering process or the like (FIG. 2). Then, in order to form platinum film 3 into a pattern of a meandering shape, photo-resist pattern 4 is formed over platinum film 3 (FIG. 3). Subsequently, by the sputtering etching process, platinum film 3 is subjected to patterning based on the photio-resist pattern 4 (FIG. 4). Moreover, after removal of photo-resist pattern 4, substrate 1 with platinum film 3 is subjected to heat-treatment again in the atmosphere for about 0.5 to 3 hours at a high temperature in the vicinity of 1,000° C. Platinum film 3 stabilized by the above heat-treatment is subjected to the adjustments of the electrical values by trimming, and thereafter, lead wires 5 are welded to the opposite ends of platinum film 3 to provide the resistance thermometer as shown in FIG. 1.

In the above manufacturing steps, since aluminum oxide film 2 serving as a ground layer for platinum film 3 is applied with the stabilizing heat-treatment, there is no adverse effect to platinum film 3 with respect to the electrical characteristics in the stabilizing heat-treatment of platinum film 3, and thus, platinum film 3 having uniform characteristics may be obtained. Accordingly, even when the above resistance thermometers are to be manufactured through mass-production in the form of chips, the scattering of characteristics is small between the chips, and therefore, a favourable reproducibility may be achieved. Meanwhile, when electric current is caused to flow in the pattern of platinum film 3 through lead wires 5, the resistance value of the platinum film is varied according to the ambient temperatures. Therefore, the ambient temperatures can be detected by measuring the above electrical resistances, and thus, the resistor of the present invention may be used as a temperature sensor.

The resistance thermometer of the present invention constructed in the manner as described so far has the particular effects as summarized below.

(1) Since the resistance thermometer of the present invention employs the silicone substrate, it is inexpensive.

(2) Owing to the construction by the silicone substrate and aluminum oxide, favorable heat-resistance is obtainable.

(3) Since the silicone substrate is once covered by aluminum oxide and the platinum film is further formed thereon, platinum does not form an alloy with the ground layer even at high temperatures, while a close adhesion of the platinum film is available.

(4) Due to the arrangement in that the platinum film is formed on the smooth silicone substrate through the aluminum oxide layer, the fine pattern of the platinum film may be easily formed.

(5) The substrate composed of silicone is readily formed into chips.

(6) The scattering in the resistance temperature characteristics of the platinum film is small, and favorable stability and reproducibility may be obtained in the sensor characteristics.

As described previously, the manufacturing method of the present invention fundamentally based on the step of forming the platinum film by the sputtering process on the insulative substrate or on the support substrate composed of a conductor or a semi-conductor and coated by the insulating material, and is characterized in that the sputtering gas in the sputtering process contains oxygen. By employing such a sputtering gas, the oxygen contained therein is to be mixed within the platinum thin film during the sputtering process, and the accumulated platinum thin film shows a crystallinity which is different from that in the case of the inert gas such as argon alone, and consequently, the TCR becomes suitable for the resistance thermometer.

In a table provided below, there is shown the relation between the oxygen concentration in the sputtering gas and the TCR related to the platinum resistance thermometer according to the embodiment of the present invention.

| Oxygen concentration in sputtering gas (%) | 0 | 0.5 | 1 | 2 | 3 | 4 | 5 | 10 | 15 |
|---|---|---|---|---|---|---|---|---|---|
| Temperature coefficient of resistance (ppm/°C.) | 3.760 | 3.800 | 3.800 | 3.850 | 3.840 | 3.840 | 3.840 | 3.800 | 3.550 |

As shown in the above table, it has been confirmed that, as compared with the TCR in the case where the sputtering gas is composed only of argon, i.e., where the oxygen concentration is 0%, the TCR of the sputtering film for platinum is raised if oxygen is contained in the sputtering gas at a certain slight concentration. However, if the oxygen concentration is extremely high, e.g. above 15%, the TCR becomes lower than that in the case where oxygen concentration is 0%, with deterioration in the close adhesion with respect to the substrate, and thus, the resistor is not suitable for actual application. The TCR becomes the highest especially when the oxygen concentration is in the vicinity of 2%.

Based on the foregoing experimental data, according to the present invention, it is so arranged that after washing the surface of a plate-like support substrate of glass, ceramics, etc., the substrate is subjected to sputtering so as to form a platinum thin film on the surface of said substrate by a target of a platinum. The sputtering gas is of a mixed gas in which oxygen gas is mixed in argon gas at a concentration in the range of from 0.5 to 10%. After accumulation up to the thicknesses in the region of about 7,000 to 10,000 Å, the platinum thin film is formed into a very fine pattern by etching or the like. Subsequently, after heat-treatment of the platinum thin film together with the support substrate for the improvement of crystallinity, film quality, adhering property, etc., the platinum thin film and the substrate are formed into chips so as to become the resistance thermometers for the temperature sensors. Upon application of an electric current from the opposite ends of the platinum thin film resistance thermometer, the platinum thin film exhibits resistance values which correspond to ambient temperatures, with the resistance value varying after changes in the temperatures, and thus, the ambient temperatures may be detected as changes in the electrical resistance values.

As referred to earlier, the manufacturing method of the present invention fundamentally includes the step of forming the platinum film by a sputtering process in which the sputtering gas contains oxygen, on the insulative substrate or on the support substrate composed of a conductor or a semi-conductor and coated by the insulating material, and is characterized in that the temperatures for the heat treatment are in the range of 400° to 800° C. When the sputtering gas containing oxygen is employed, the oxygen is to be mixed within the platinum thin film during the sputtering process, and the accumulated platinum thin film shows crystallinity which is different from that in the case of the inert gas such as argon alone, and consequently, the TCR suitable for the resistance thermometer may be obtained even by the heat treatment at low temperatures.

Provided below is a table showing the relation between the heat-treating temperatures and the TCR for the platinum resistance thermometer according to the embodiment of the present invention.

| | | Without heat treatment | Heat-treating Temperature (°C.) | | | | | |
|---|---|---|---|---|---|---|---|---|
| | | | 400 | 500 | 600 | 700 | 800 | 900 |
| Temperature coefficient of resistance | Containing oxygen | 3.710 | 3.790 | 3.850 | 3.870 | 3.870 | 3.870 | 3.870 |
| | Inert gas only | 3.650 | 3.660 | 3.690 | 3.720 | 3.750 | 3.810 | 3.830 |

| | -continued | | | | | |
|---|---|---|---|---|---|---|
| | Without heat treatment | Heat-treating Temperature (°C.) | | | | |
| | | 400 | 500 | 600 | 700 | 800 | 900 |
| (ppm/°C.) | | | | | | | |

As shown in the above table, it has been ensured that, as compared with the TCR in the case where the sputtering gas is composed only of the inert gas, the TCR of the platinum sputtering film containing a certain amount of oxygen in the sputtering gas is sufficiently high even by the low temperature heat treatment in the range of 400° to 800° C.

Based on the foregoing experimental data, according to the present embodiment, it is so arranged that, after washing the surface of a plate-like support substrate of glass, ceramics, etc., the substrate is subjected to sputtering so as to form a platinum thin film on the surface of said substrate by a target of a platinum. The sputtering gas is of a mixed gas in which oxygen gas is mixed in argon gas at the concentration in the range of about 0.2 to 20%. (In the present embodiment, the oxygen concentration is set at about 2%.) After accumulation up to the thicknesses in the region of about 1,000 to 10,000 Å, the platinum thin film is formed into a very fine pattern by etching or the like. Subsequently, after heat-treatment of the platinum thin film together with the support substrate for about 1 to 3 hours at low temperatures of about 600° C. for the improvement of crystallinity, film quality, adhering property, etc., the platinum thin film and the substrate are formed into chips so as to be the temperature measuring resistors for the temperature sensors. Upon application of electric current from the opposite ends of the platinum thin film resistance thermometer thus obtained, the platinum thin film shows resistance values corresponding to ambient temperatures, with the resistance value varying after changes in the ambient temperatures, and thus, the ambient temperatures may be detected as changes in the electrical resistance values.

As is seen from the foregoing description, the platinum thin film obtained by the present embodiment has a TCR which is higher than that in the conventional thin films, with improved adhesion with respect to the substrate, thereby providing a platinum thin film resistance thermometer with high sensitivity.

Furthermore, a referred to earlier, according to the present invention, in the resistance thermometer in which the resistant film made of a thin film of a thick film in a pattern is formed on the insulative substrate, corresponding adjusting values are displayed in positions in the vicinity of the respective adjusting portions of a resistance value adjusting pattern.

By the above arrangement of the present invention, since the adjusting values for the respective adjusting portions in the resistant value adjusting pattern are clearly understood at a glance, there is almost no possibility for mis-adjustment, and thus, the adjusting work may be effected extremely quickly.

Figure 5:
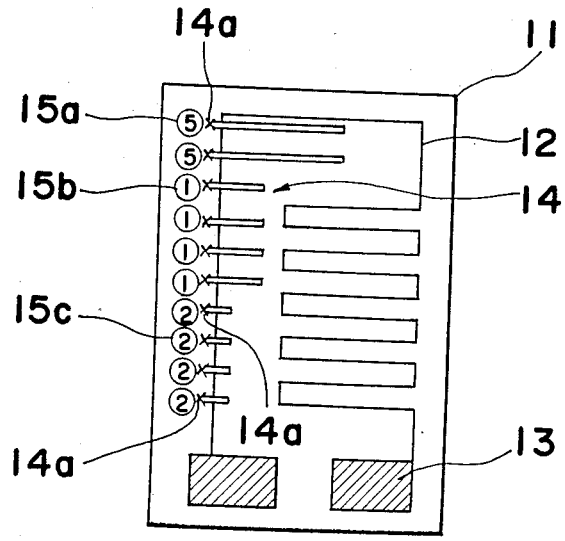
FIG. 5 is a top plan view showing a resistance thermometer according to another embodiment of the present invention.

Referring to FIG. 5, there is shown a resistance thermometer according to another embodiment of the present invention, which generally includes insulating substrate 11, resistant film 12 formed into a pattern by a thin film, and lead connecting pads 13 respectively provided at opposite ends of said resistant film 12. Meanwhile, a plurality of spaced resistance value adjusting patterns 14 are connected for electrical conduction to resistance film 12, for example, in a parallel relation as shown, and adjusting portions 14a respectively shown by X marks for patterns 14 are aligned in a straight line, while in positions close to respective adjusting portions 14a, adjusting values 15a, 15b, and 15c, etc., are shown by the encircled figures so as to correspond to respective adjusting portions 14a as illustrated.

For effecting the resistance value adjustments in the resistance thermometer having the construction as described above, by cutting off required adjusting portion 14a with a laser beam, the resistance value of the pattern at the portion thus cut off is to be added. In this case, since the resistance value to be added by the cutting off of such adjusting portion 14a is displayed at each adjusting value adjacent to corresponding adjusting portion 14a, the adjustment may be made without any mistake by effecting the cutting off while observing such adjusting value. The arrangement of adjusting portions 14a on the straight line is particularly effective for efficient and quick processing in the above case.

It is to be noted here that the encircled figures ⑤, ① and ⓪.② displayed as the adjusting values 15a to 15c in FIG. 5 respectively, represent percentage values with respect to the total resistance value of resistant film 12, and in this embodiment, show 5%, 1% and 0.2%. Thus, it is so arranged that the adjustment of the resistance values may be effected up to the maximum 14.8% at a step of 0.2%.

It should also be noted that the resistance values themselves may be displayed as adjusting values 15a to 15c, but owing to the fact that the resistance values at respective portions of the resistance value adjusting pattern tend to scatter between elements or lots, it is preferable to display them by the percentage, or symbols corresponding to percentage as in the above embodiment.

Additionally, such adjusting values 15a to 15c should preferably be simultaneously formed by the same material during formation of resistance film 2 through etching. Moreover, the arrangement of adjusting portions 14a on a straight line as in the present embodiment is advantageous in that during successive cutting of a large number of elements aligned in one wafer, such wafer or processing source can be moved in a straight line, and thus, operation is simplified for improved working efficiency.

The present invention is further characterized in that large and small signals are alternately applied to the resistance thermometer, so that at the small signal, the fluid temperature is measured by the resistance value by setting the temperature of the resistance thermometer to be equal to that of the fluid, while at the large signal, heat is generated by the resistance thermometer to measure the heat generating temperature by the resistance value, whereby the flow velocity is obtained through utilization of variation of the heat generating temperature by the flow velocity. By the above arrangement, there is an advantage that the flow velocity can be measured through simple circuit construction without being affected by the temperature of the fluid.

Figure 6:
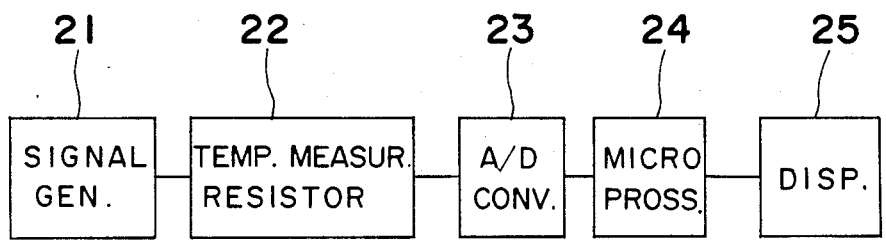
FIG. 6 is a block diagram showing general construction of a flow velocity measuring circuit according to a further embodiment of the present invention.
Figure 7:
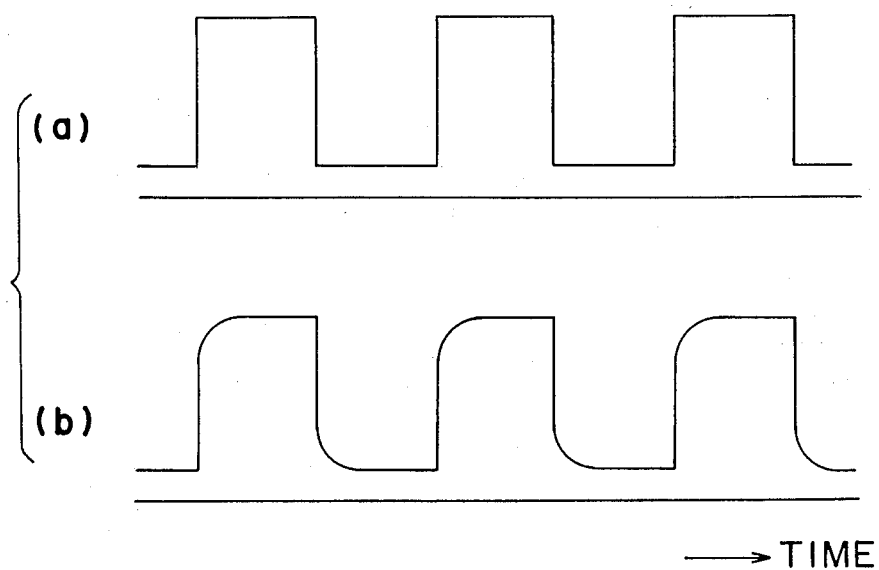
FIG. 7 is a waveform diagram showing voltage to be produced by the flow velocity measuring circuit of FIG. 6.

Reference is made to a block diagram in FIG. 6 showing general construction of a flow velocity measuring circuit according to a further embodiment of the present invention, and also, to a waveform diagram in FIG. 7 representing voltage to be produced by the flow velocity measuring circuit of FIG. 6.

Figure 8:
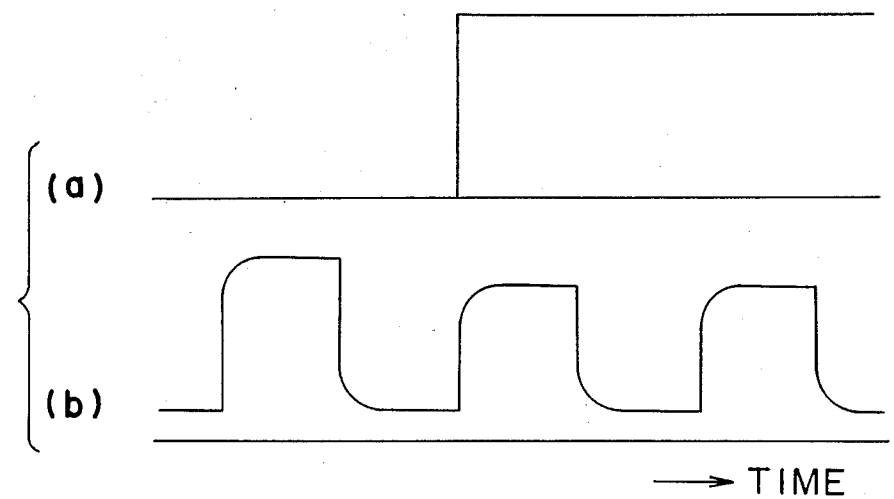
FIG. 8 is a waveform diagram showing variation of the flow velocity and the output from the resistance thermometer.

The square wave current as shown in FIG. 7(a) produced from signal generator 21 is applied to platinum thin film resistance thermometer 22 whose resistance value is to vary following variation in temperature. Resistance thermometer 22 is fixedly disposed in the fluid to be measured so as to be thermally combined with the fluid, and does not generate heat when the input current is small. Therefore, the temperature of the fluid is generally equal to that of resistance thermometer 22, and the resistance value of resistor 22 may be found by the output voltage from said resistor 22. The resistance value and the temperature of resistance thermometer 22 are in a functional relation, and accordingly, the temperature of the fluid may be obtained through detection of the resistance value of resistor 22. Then, upon an increase of the input current, resistance thermometer 22 produces heat. In this case, if the fluid is not flowing, resistor 22 is held constant at a certain temperature. Thus, when the fluid starts flowing, heat is absorbed from resistor 22 to the fluid, and the temperature of resistor 22 generating heat is lowered, with reduction of the resistance value thereof. Additionally, since the heat amount to be absorbed by the fluid is increased with an increase of the flow velocity, the temperature of resistor 22 largely falls by that extent, with consequent lowering of the resistance value. In FIG. 7(b), there is shown the output voltage from resistance thermometer 22. When the output from resistor 22 is measured immediately before the current to be applied to said resistor 22 is changed from a small current to a small current, the temperature of the fluid can be measured, while, when it is measured immediately before said current is changed to the large current, the flow velocity may be obtained from the following equation (1). The output from resistance thermometer 22 is applied to microprocessor 24 through A/D converter 23, and after it is subjected to a logical operation processing, the flow velocity is displayed at display section 25 coupled to microprocessor 24.

$$I^2 Rh = (A + B\sqrt{v})(Th - Ta) \quad (1)$$

where
I: current for causing the resistor to generate heat
Rh: resistance when the resistor generates heat
Th: temperature when the resistor generates heat
Ta: fluid temperature
v: flow velocity
A, B: constants FIG. 8 relates to the case where the flow velocity is varied, in which FIG. 8(a) denotes the flow velocity, and FIG. 8(b) represents the output from resistance thermometer 22. It will be seen that, although the output during the large current period varies as shown in FIG. 8(b) according to the variation of the flow velocity, the output during the small current period does not vary since there is no change in the temperature of the fluid.

Figure 9:
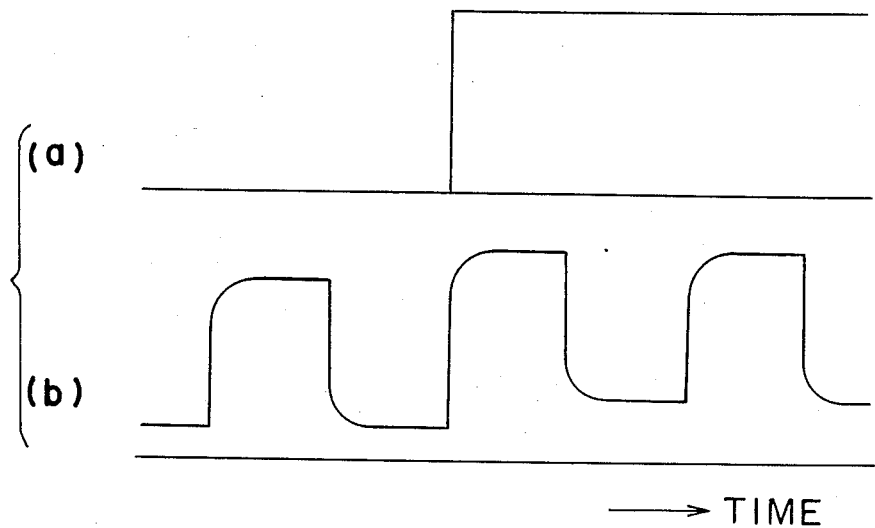
FIG. 9 is a waveform diagram showing a variation of the fluid temperature and the output from the resistance thermometer.

Meanwhile, FIG. 9 relates to the case where the temperature of the fluid has varied, in which FIG. 9(a) represents the temperature variation of the fluid, while FIG. 9(b) shows the output from the resistance thermometer 22. In the case where the temperature of the fluid has varied, the output during the large current period varies even if the flow velocity does not vary, but since the output during the small current period is also altered, temperature compensation may be effected based on such values, and thus, it becomes possible to obtain the accurate flow velocity.

It is to be noted herein that the frequency of the square wave current from signal generator 21 is determined by the heat response speed of resistance thermometer 22, and accordingly, the smaller the thermal capacity of resistor 22, the faster the heat response speed, and thus, a high speed measurement is made possible, by increasing the frequency of the square wave signal from signal generator 21.

It should also be noted that the platinum thin film resistance thermometer described as employed in the foregoing embodiment may be replaced by other metallic resistance thermometer, thermistor and the like depending on necessity.

As is clear from the foregoing description, in the flow velocity measuring method according to the present invention, since one resistor is commonly used for the resistance thermometer and heat generating resistor, the TCR for both are in a perfect arrangement, with less measuring errors. Furthermore, there is such an advantage that the structure of the element is simplified for compact size and reduction in cost.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A method of manufacturing a resistance thermometer which comprises the steps of forming an aluminum oxide film on a silicone substrate, subjecting the formed aluminum oxide film to heat-treatment at a temperature in the range of from 500° to 1,700° C., and thereafter, forming a platinum film on the surface of the formed heat-treated aluminum oxide film.

2. The method of claim 1, wherein the formed platinum film is thereafter subjected to heat-treatment at a temperature in the range of from 500° to 1,500° C.

3. The method of claim 2, wherein the heat-treatment temperature of the formed aluminum oxide film is equal to or higher than the heat-treatment temperature of the formed platinum film.

* * * * *